(12) United States Patent
Akhrarov et al.

(10) Patent No.: US 8,036,999 B2
(45) Date of Patent: Oct. 11, 2011

(54) METHOD FOR ANALYZING AND CLASSIFYING PROCESS DATA THAT OPERATES A KNOWLEDGE BASE IN AN OPEN-BOOK MODE BEFORE DEFINING ANY CLUSTERS

(75) Inventors: Murad Akhrarov, Santa Clara, CA (US); Joe Bates, Joliet, IL (US); Peter Millett, Bremen, ME (US); Chanchal Sharma, Lee, NH (US)

(73) Assignee: Isagacity, Portland, ME (US)

( * ) Notice: Subject to any disclaimer, the term of this patent is extended or adjusted under 35 U.S.C. 154(b) by 884 days.

(21) Appl. No.: 12/030,437

(22) Filed: Feb. 13, 2008

(65) Prior Publication Data
US 2010/0030521 A1 Feb. 4, 2010

Related U.S. Application Data

(60) Provisional application No. 60/901,389, filed on Feb. 14, 2007.

(51) Int. Cl.
*G06F 17/00* (2006.01)
(52) U.S. Cl. ........................................................ 706/45
(58) Field of Classification Search .......... 702/181–189, 702/121–123; 706/12, 20, 45–48; 707/737
See application file for complete search history.

(56) References Cited

U.S. PATENT DOCUMENTS

| | | | |
|---|---|---|---|
| 6,006,170 A * | 12/1999 | Marcantonio et al. | 702/182 |
| 6,917,839 B2 * | 7/2005 | Bickford | 700/30 |
| 7,383,238 B1 | 6/2008 | Iverson | |
| 2003/0224344 A1 * | 12/2003 | Shamir et al. | 435/4 |
| 2010/0030521 A1 * | 2/2010 | Akhrarov et al. | 702/182 |

OTHER PUBLICATIONS

Can, et al., Dynamic Cluster Maintenance, 1987, ACM, pp. 275-291.*
Aggarwal et al., On Demand Classification of Data Streams, 2004, ACM, pp. 1-6.*
Iverson, David L., Inductive System Health Monitoring, 2004 International Conference on Artificial Intelligence, Jun. 2004, 7 pages, CSREA Press, Las Vegas, NV.

* cited by examiner

*Primary Examiner* — David Vincent
(74) *Attorney, Agent, or Firm* — Patricia M. Mathers

(57) ABSTRACT

Process data mining system and method. The system analyzes data from complex process plants or systems and operates in open-book and closed-book modes. In closed-book mode, the system monitors incoming data sets against pre-defined clusters of data values and generates reports, indicating whether incoming data is a match or a no-match with the pre-defined clusters. In open-book mode, the system generates initial clusters, without having a-priori knowledge of the component or process, and also creates clusters "on the fly", thereby fine-tuning the analysis. A knowledge base encompasses a combination of parameters for a particular component. Clusters are defined within the knowledge base, each cluster representing a particular operating condition. The system expands clusters, within pre-defined limits, or creates new clusters, as needed, in order to accommodate incoming data values. Newly created clusters are then named, so as to indicate the particular operating conditions.

11 Claims, 11 Drawing Sheets

METHOD FOR ANALYZING AND CLASSIFYING PROCESS DATA THAT OPERATES A KNOWLEDGE BASE IN AN OPEN-BOOK MODE BEFORE DEFINING ANY CLUSTERS

BACKGROUND INFORMATION

1. Field of the Invention

The invention relates to the field of monitoring industrial process plants. More particularly, the invention relates to a method of process data mining.

2. Description of the Prior Art

Industrial process plants employ various means to monitor processes and equipment. These may be Intelligent Electronic Devices (IED) specially made for particular equipment or some mathematical modeling method. IEDs are designed around the concept of a feedback control loop based on traditional control theory. Usually set points are defined within the range of data; violations of these set points trigger an alarm mode. These methods, while excellent at determining violation of set conditions and/or adjusting the control loop accordingly when system parameters change, are usually computationally intensive, even for monitoring and controlling a single piece of equipment. The complexity of such systems increases exponentially when implemented at the plant level, let alone for a fleet-wide implementation.

On the other hand, most mathematical methods employed in the industry currently utilize a two step process for analyzing and monitoring data: a training step and a monitoring step. In the training step, the system "learns" the modeling parameters, based on a-priori data, and in the monitoring step, the system monitors the equipment or the process against the "learned" result.

The major disadvantage of using such a two step process for learning and monitoring is that inconsistent results may be observed if the model changes due to a changing physical process, corrupt data, sensor malfunction etc. In such cases, there are no sure ways to know why the results are inconsistent and this gives rise to the possibility of false alarm.

Another obvious limitation is that a "clean" or optimal set of data is required to train the model before monitoring can be performed. This initial optimal data set usually is not available for the real world and has to be obtained either from simulation or from filtering existing prior data. If the model developed in such a way has some errors, or if some unforeseen event is seen in the data, the model has to be retrained to account for such a data point. This retraining of the model introduces an added effort in the monitoring step.

What is needed, therefore, is a method for analyzing and classifying process data that does not require a clean set of data for training purposes, but that learns parameters on the fly by looking at changing data. What is further needed is such a method that optimizes the control data as more data is added. What is yet further needed is such a method that differentiates between key parameters and base parameters. What is still yet further needed is such a method that combines outputs of related sensors.

BRIEF SUMMARY OF THE INVENTION

The method according to the invention is referred to as "process data mining" and the software used to accomplish the data mining is referred to as the "process data miner" or PDM. Process data mining is a method of collecting data from some complex system containing multiple elements or components and analyzing that data, using a PDM algorithm. In the description below, reference will be made to an industrial process plant (IPP), but it is understood that the complex system from which data is mined may be a very different type of system, such as the human body or certain systems within the human body, financial data and systems, communication systems, complex weather systems, etc.

Definitions: Certain terms used throughout this document are defined below. The definitions pertain to the use of these terms within the software system developed.

Process Plant: The industrial process plant (IPP) is representative of a complex system and serves as an illustrative example hereinafter as the highest object in the hierarchy of systems and components to be mined. Some examples of such plants are power plants, manufacturing plants, and petrochemical processing plants, but the IPP to be mined is not limited to these types of processing plants.

Component: A physical entity, a piece of equipment, such as a pump, or a location in a system, such as feedwater in a steam boiler system.

Equipment: A physical piece of equipment, from which data is mined and which the PDM software monitors. Physical sensors monitor various operating parameters the operation of a piece of equipment. Some examples of equipment are pumps, generators, turbines, etc. Examples of parameters that are monitored on a pump, for example, include pressure, bearing oil temperature, shaft vibration, flowrate, etc.

Process: In addition to equipment, an IPP may have physical processes associated with it. Examples of such processes are chemical processes that monitor the quality of materials or of fuel that is used in the IPP. The health of processes is also monitored, by using physical sensors to monitor certain operating parameters at on-site locations. Typically, sensor output is digitized and stored in a data historian.

Data Channel: A data channel carries digitized data, such as measurement output from sensors or transducers of different operational parameters of equipment and/or processes. Each component of the IPP has one or more data channels, each data channel carrying the output of a specific parameter, i.e., a specific sensor or transducer of the component. Each data channel has a set of characteristics that identify it, such as the component or location it relates to, the value of the sensor reading, the timestamp of the reading, the units associated with the data and so on. The term "data channel" is used hereinafter to refer directly to the specific parameter, rather than merely its function of carrying the data of that specific parameter.

System Model: A system model or system refers to the collection of correlated data channels, knowledge bases, and clusters, etc. of an IPP under consideration by the PDM algorithm at a particular time.

Knowledge Base: A knowledge base encompasses a collection of correlated data channels for a given piece of equipment or process. The correlation may be a functional correlation determined by a mathematical model, heuristics, or may be based on some other functional relationship. A knowledge base is the primary unit of monitoring in an IPP and may be specifically defined as a fault condition or as the optimum condition that the system is expected to run on. One knowledge base may contain several system models. The status of the knowledge base describes the health or status of the IPP under scrutiny. The knowledge bases described below are developed using a clustering algorithm, but it is understood that they may be developed using other suitable methods, such as clustering, artificial neural networks (ANN), principal component analysis (PCA), etc. Knowledge bases may be hierarchically organized into parent-child relationships.

Data Vector: A data vector is defined as a set of two or more related measurements of incoming data. In other words, a data vector contains data from a set of data channels. For example, the data vector is related to a pump and includes the data channels that are associated with the pump, such as pressure, flow rate, vibration, and bearing oil temperature.

Cluster: A cluster is the basic unit of the knowledge base and is a collection of the data channels that define a particular data vector. The number of data channels in a cluster corresponds to the number of data channels that defines the knowledge base to which the cluster belongs. A particular cluster within a knowledge base includes definitive minimum-maximum tolerance ranges that are assigned to the various data channels. The tolerance may be pre-defined or may be a percent deviation from the mean or average. Each minimum-maximum tolerance within a cluster corresponds to a particular operating condition or state that is relevant to the particular cluster. The data channels in each data vector included within the cluster carry values that fit within the tolerance specified for that parameter in that particular cluster. For example, a certain relationship is presumed between pressure, flow, bearing oil temperature, and shaft vibration for a specific pump at a given plant power level. Thus, for a cluster indicative of normal operating power level, each data channel, i.e., pressure, flow, bearing oil temperature, and shaft vibration, in the data vector of that cluster is assigned a minimum-maximum tolerance range that corresponds to the operating parameters at normal operating power level. A second cluster indicative of a particular fault condition for the same pump at the same power level will have assigned different minimum-maximum tolerances to the data vector, these tolerances being predictive of that particular fault condition. Clusters may be organized hierarchically in parent-child relationships. A clustering algorithm is used as a means to partition and model the data space. The terms "cluster" and "model" are used interchangeably throughout this document. Clusters may be defined manually within a knowledge base by the operator or user. Alternatively, the PDM algorithm has the ability to dynamically interpret the data space and form appropriate clusters on its own, without intervention or supervision from the user. In other words, no a-priori knowledge of the system model, the data space, or the behavior of the system is required to form clusters. This ability to dynamically interpret data and form clusters allows the system to be run in an unsupervised learning mode.

Fingerprinting: Fingerprinting is a generic term that refers a method of creating a pattern or cluster for the system model within an IPP that is being monitored. A pattern is a collection of clusters that is specific to a scenario or a condition of whatever is being monitored. Incoming data is compared with the pattern, as a means of monitoring of the state of the equipment or process under surveillance. In the description provided below, the fingerprinting method uses a known clustering algorithm, such as the one disclosed in "Inductive System Health Monitoring", David L. Iverson, published in the Proceedings of The 2004 International Conference on Artificial Intelligence (IC-AI '04), CSREA Press, Las Vegas, Nev., June 2004. Those skilled in the art, however, will recognize that several other techniques, such as linear and non-linear parameter estimation techniques, autoregressive models, moving average models, Kalman filter banks etc., may be used to develop a fingerprint for a system model.

Expectation: Expectation is a special cluster defined within a knowledge base. The expectation cluster may be defined by the user, based on a-priori information. Alternatively, the expectation may initially be a cluster learned by the PDM algorithm on its own after several iterations through the data space and subsequently be identified by the user as an expectation cluster. If the knowledge base is defined as a fault condition or condition of concern for the operation of the IPP, the expectation cluster could define a region in the data space that a plant operator would want to observe, if such a fault condition of interest were to occur in the IPP.

Distance: Distance is a relative measure of differences between entities in the PDM. A distance may be measured between a data set and a set of clusters or between clusters themselves. Because distance is a relative measurement, it is meaningful only if compared within a knowledge base. A comparison of distances from different knowledge bases is meaningless.

Residual: A residual is a special case of distance and is defined as the difference between the expected and actual behaviors of the system. The expected behavior of the system may be predefined by the user as an expectation cluster or be learned by the PDM during its operation. The PDM then calculates the residual as the difference or the Euclidean "distance" between the observed data and the expected output of the model of the system. The magnitude of the residual is indicative of the instantaneous health of the plant. The rate of change and direction of a residual is indicative of how fast the health of the plant is improving or deteriorating.

Open/Closed Book Mode: Each knowledge base may be defined in either of two modes, termed the "open book mode" and the "closed book mode". The "open book mode" is the learning mode, and the "closed book mode" is the monitoring mode. The terms open book mode and learning mode are used interchangeably throughout this disclosure, as are the terms closed book mode and monitoring mode. In the learning mode, the PDM forms new clusters from incoming data that do not match any of the pre-defined or pre-existing clusters. If the same data are seen again, then PDM determines the second set of data to be a match to the newly formed cluster. In this manner, the PDM learns about a new state in the knowledge base that it is analyzing and expands the knowledge base to accommodate this new state. In the monitoring mode, the PDM, upon recognizing incoming data that do not match any of the existing clusters, provides a report on the distance of the data from predefined clusters.

Method of Process Data Mining: The method of process data mining according to the invention combines a closed-book or monitoring mode with an open-book or learning mode. The open-book mode requires no a-priori data and is capable of learning parameters and limits as it sees incoming changing data. This allows one to employ the method on a new piece of equipment or a new process step, without an operator first having to provide base data. The closed-book mode, on the other hand, requires a minimum set of data to operate, as this mode compares incoming data with pre-defined data and generates reports, based on deviations or matches of the incoming data with the pre-defined data. Ideally, both modes are in operation simultaneously, so that the method is simultaneously monitoring and reporting on current conditions and is also generating new clusters in a learning process, which helps to optimize or fine-tune data analysis. The method may be used to monitor a single piece of equipment, or a single process at minimum. The method may also be used to monitor multiple pieces of equipment, processes, or a combination of related equipment and processes. A further feature of the method according to the invention is that it allows an operator to define "key" parameters and "base" parameters, the key parameters being those that are particularly predictive of a particular operating state.

As a first step, digitized data are collected from sensors that monitor processes or equipment in the IPP and are stored in a centralized location, a data historian. The data historian may be maintained by the IPP or a third party service located somewhere outside of the plant. Analysis of the IPP data provides a measure of the overall health of the plant and is the primary objective of the PDM. Basic signal conditioning, such as filtering, smoothing, noise removal and digitization, may already have been done on raw signals measured by actual physical sensors before they are input into the data historian.

The data are delivered to the PDM via specific data channels, each sensor having its own data channel and each data channel having a unique data channel name. Thus, each data channel represents a particular parameter of the IPP. One piece of equipment used in an IPP may have several data channels associated with it. The data channels are organized into knowledge bases, to facilitate analysis of particular processes or areas of the IPP. Real time or pseudo-real time data are classified within these knowledge bases, using a suitable technique such as clustering, artificial neural network, Gaussian filtering, Kalman filter banks, correlation techniques, principal component analysis technique (PCA), heuristic methods, mathematical models, etc. The knowledge bases may represent different operating states of "components" within a process plant, such as fault conditions, normal operating conditions or expected behavior of the system being monitored, etc.

Some data channels, i.e., some parameters, may be defined as key parameters. Key parameters are parameters that are indicative of critical process states. For example, in electrical power plants, the plant load is a key parameter, because the behavior of components varies under different load conditions. The parameters that are indicative of fault or normal operating conditions also change according to the change in load. It is therefore meaningful to first determine the load parameters before performing further analysis on components. Different data channels within a knowledge base may also be given different weights, depending upon, for example, their contribution to the evolution of the process or how indicative they are of a fault condition.

The data channels are then combined into user-defined clusters, based on a-priori knowledge of the IPP operators. For example, data channels or parameters from a particular pump, which carry data relating to bearing oil temperature, speed, shaft vibration, etc., are gathered into a "pump" cluster. The cluster is given a minimum-maximum tolerance range. Several clusters for the same "pump" may be defined, each cluster representing a different operating condition, such as optimal operating condition, a fault condition, a condition indicative of a pending fault, etc. Any combination of parameters is possible. Thus, parameters from different key pieces of equipment and key process steps may be combined to a cluster. And, again, several clusters of this particular grouping of parameters may be defined, each cluster indicative of a different operating condition.

The PDM method according to the invention has the ability to "learn" new clusters on the fly, without input from IPP operators. In learning mode, the PDM expands a knowledge base by expanding the boundaries of a cluster, in order to accept data within a certain range that is beyond the initially defined minimum-maximum tolerance, or generates new clusters to encompass data that does not fall within certain pre-defined limits of any relevant clusters. The knowledge bases are expanded as a function of key parameters, data channels, time derivatives of the data, integrals of the data and/or calculated formulas, or one or more data channels and/or their derivatives and/or their integrals. Expansion of a knowledge base implies that the system either learns about new operating states that were not predefined or expands predefined clusters.

The PDM builds a model for the present condition of a cluster, based on an adaptive filtering algorithm, such as a Kalman filter, a particle filter, an autoregressive moving average, etc., to generate a predictive analysis of future behavior of the data channels. The PDM compares the output of such a predictive component of the PDM to incoming data. If the error between the two data sets is greater than a preset acceptable level, the PDM flags the incoming data as a new cluster and then creates a new model for the data.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
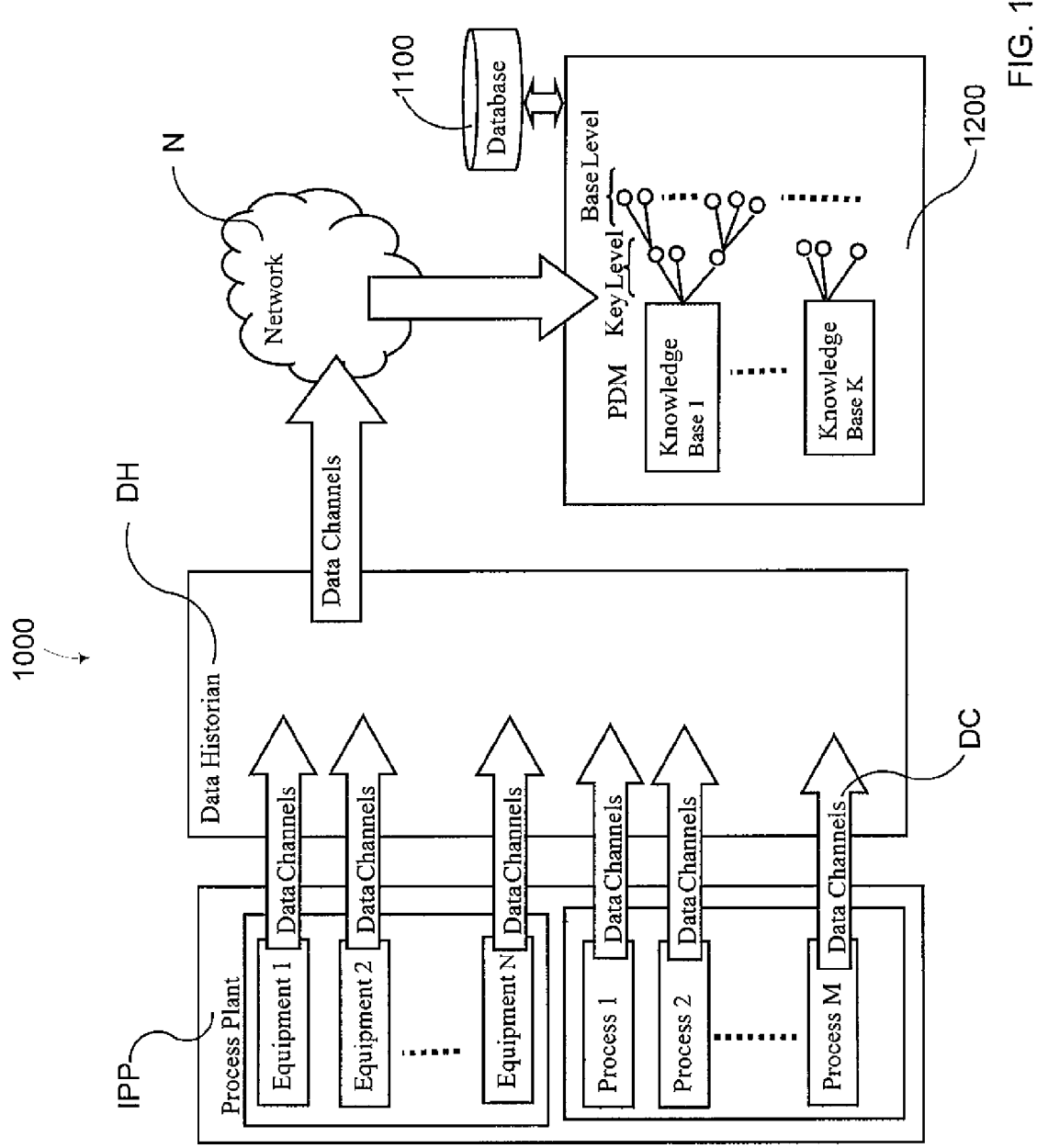
FIG. 1 is a block diagram illustrating the topology of the software architecture and objects within the PDM method according to the invention.

FIG. 1 is a block diagram of a Process Data Miner (PDM) system 1000, showing the topology of the software architecture, the objects that are present within the PDM software, and the inter-relations between these objects. The PDM system 1000 comprises a database 1100 and PDM software 1200, which includes a PDM algorithm. The database 1100 stores generic information about plant processes and equipment, such as a location of origin of a data channel, a tag accompanying a data channel, a value of data in a data channel, a timestamp received with the data channel, and a time at which the data is received at the server. Along with these data, PDM software 1200 also stores internal calculated values in the database 1100. For the sake of clarity, the PDM system 1000 is shown in FIG. 1 as processing data from a single industrial process plant IPP, when in practice, the system may simultaneously process data from several IPPs. Although the "plant" that provides the data to the PDM system 1000 is described as an industrial process plant, it is understood that this is a term used to identify the source of the data and that the source may be any type of facility or system that performs transformative steps on a substance or process. Various pieces of equipment in the IPP are linked via data channels DC to a data source or data historian DH. Each piece of equipment or process step to be monitored is equipped with one or more sensors. The output signals from the sensors are stored as digitized data in the data historian DH. Each sensor has its own data channel DC and each data channel DC is linked to the PDM system 1000, typically via a network N. The network may be an Intranet, Extranet or the Internet with a Virtual Private Network (VPN) as a top layer. The PDM system may also be run completely within the plant IPP, without going through a network.

For purposes of illustration only, a single component in the plant IPP, a pump, will be relied upon in the description to illustrate the process of data mining. The following parameters in the pump will be monitored: flow rate, temperature, pressure, shaft vibration, and load. The goal is to determine whether the pump is overheating and to be able to intervene before imminent failure occurs. It is understood that a number of pumps or a combination of pumps and other equipment or processes may be included in the plant IPP, with the corresponding knowledge bases incorporated into PDM system 1000, but for the sake of simplicity, the example is for a single piece of equipment.

A knowledge base is defined as "pump overheating (OB)," which represents the operating state that is to be predictively identified. The data channels associated with the knowledge base "pump overheating (OB)" are as mentioned above, load, flow rate, temperature, pressure, and shaft vibration. Among these data channels, the parameter "load" is identified as a key parameter, because it is known that the pump behaves differently under different load conditions. For example, the normal temperature range lies within certain limits when the plant load is 40% to 60%, but the same temperature range may be too high for normal operating conditions, when the plant load is only 20%. It is therefore expedient to first identify the load range at which the pump is running, before looking at the other parameters.

The tag (OB) indicates that the knowledge base has been defined in open book mode. The same knowledge base is also defined in closed book mode and called "pump overheating (CB)". The tag (CB) indicates that the knowledge base is in closed book mode.

The normal operating ranges and overheating ranges for all the data channels are roughly known. By "roughly" is meant that ranges are known for ideal operating conditions. A plant may operate in a non-ideal condition, making some of the ranges invalid. In such cases, the PDM system 1000, by processing the knowledge base in open-book mode, "learns" non-ideal conditions and provides information that allows an operator to recognize when a non-ideal condition is developing. It is particularly advantageous to operate the PDM system simultaneously in open-book mode and in closed book mode. The closed-book mode provides a report on a process or component that is operating in a non-ideal state, whereas the simultaneously operated open-book mode generates a new cluster representative of that particular non-ideal state. This newly generated cluster is assigned an appropriate name at some point, so that, when the particular non-ideal state next occurs, it is immediately apparent to the operator what the non-ideal condition is.

Referring again to the pump illustration, clusters are defined for key parameter data channels that correspond to the ranges: "less that 20%"; "21% to 60%"; and "greater than 61%". These three clusters serve as "parent" clusters for the key level processing. Two additional clusters are defined as "child" clusters for each of the parent clusters: "Pump Normal Operation" and "Pump Overheating". The first child cluster defines the ranges for each data channel for the ideal normal operation of the pump, and the second child cluster defines the ranges for each data channel when the pump is overheating. Advantageously, yet another cluster "Pump Normal Operation" is defined as the Expectation cluster, i.e., as the cluster that is representative of the expected sensor values from the pump in normal operating mode most of the time. All monitoring is done against the min/max values defined for this expectation cluster. Alternatively, the expectation cluster may be defined as representative of the operating condition "Pump Overheating." In this case, the PDM system 1000 monitors the incoming sensor values with respect to the fault condition and reports on the evolution of the pump condition over time against the fault condition. Monitoring against the fault condition is the inverse of monitoring against the normal operating condition.

In the example given here, each parent cluster has two child clusters subordinate to it, i.e., Less than 20%
->Pump Normal Operations
->Pump Overheating
21% to 60%
->Pump Normal Operations
->Pump Overheating
Greater than 61%
->Pump Normal Operations
->Pump Overheating The overall view of the knowledge bases for "pump overheating" is as follows:

Knowledge Bases:
"pump overheating (OB)"
"pump overheating (CB)"
Data Channels associated with "pump overheating (OB)"/"pump overheating (CB)"
Load (Key Parameter)
Temperature
Pressure
Flow Rate
Shaft Vibration
Initial Clusters for both "pump overheating (OB)"/"pump overheating (CB)"
Less than 20% (parent)
21% to 60% (parent)
Greater than 61% (parent)
Pump Overheating (child)
Pump Normal Operation (child) (Expectation)

Once the knowledge base has been defined, the PDM software 100 is ready to receive incoming data from the plant IPP, and to process the received data with the PDM algorithm. As mentioned previously, it is not necessary to define initial clusters prior to first using the PDM system 1000 according to the invention. The system 1000 in open-book mode is capable of learning initial clusters and comparing data with those clusters.

Operation of the knowledge base "pump overheating (OB)", i.e., open-book mode: The plant IPP sends all the data for a particular time in bulk, i.e., it sends the data for all data channels in the knowledge base at the same time. The algorithm thus receives data for each data channel, load, temperature, pressure, flow rate, and shaft vibration at the same time and initiates data processing for the key level parameters, which, in the case of the example, is the load parameter.

On receiving the first set of data, the algorithm first stores that data in raw form in the database DB. It then identifies the data for load as being the key parameter and clusters this data. The algorithm looks into pre-defined clusters to determine whether the received data matches any of the defined clusters. If it does not, the algorithm expands the knowledge base, either by expanding the cluster boundaries, if possible, of one of the clusters to encompass the set of data, or, if expansion of cluster boundaries is not possible, by creating a new cluster. This first level of cluster formed is termed the "parent" cluster and is associated with the "parent" knowledge base that contains only those data channels that were identified as key level data channels when the knowledge bases were defined.

On the second pass, the algorithm clusters the next set of received data. This time it considers all data channels related to the knowledge base. It then tries to fit, if possible, the incoming data into either one of the child clusters. If the received set of data is outside pre-defined cluster boundaries, yet within certain expansion tolerances, the algorithm expands the cluster boundaries of the appropriate cluster. If the distance of the values in the received data set is too great from the values of the closest cluster, such that the cluster boundaries cannot be expanded, then a new child cluster is created to accommodate this new data. The algorithm reports the distances of the set of data to the closest cluster and stores all appropriate data in the database.

It is clear to those skilled in the art, that any number of knowledge bases may be defined within a plant IPP, to trap specific faults within a system and monitor against the normal operating mode of the system. Staying with the example of the pump, incoming data sets may not match any of the clusters, if the pump bearing is slowly degrading. The knowledge base in open book mode will form intermediate clusters as the pump deteriorates from the normal condition to the fault condition. In this case, the system identifies a slowly evolving fault condition. At the same time, the knowledge base may form many other clusters, if some other fault (related or otherwise to the bearing overheating condition) is occurring on the pump, for example loss of flow, or loss of power.

Operation of the knowledge base "pump overheating (CB)", i.e., closed book mode: The processing steps for the closed book mode are similar to those in open book mode, but instead of expanding clusters or creating new clusters (either parent or child) to accommodate the incoming data, the algorithm simply reports the distances to the pre-defined clusters. The plant operator or user typically runs both open book and closed book modes of the knowledge base at the same time and uses the open book mode to learn new conditions (other than the pre-defined ideal conditions) and then later define them in closed book condition, so that they can be reported in near-real-time.

Figure 2:
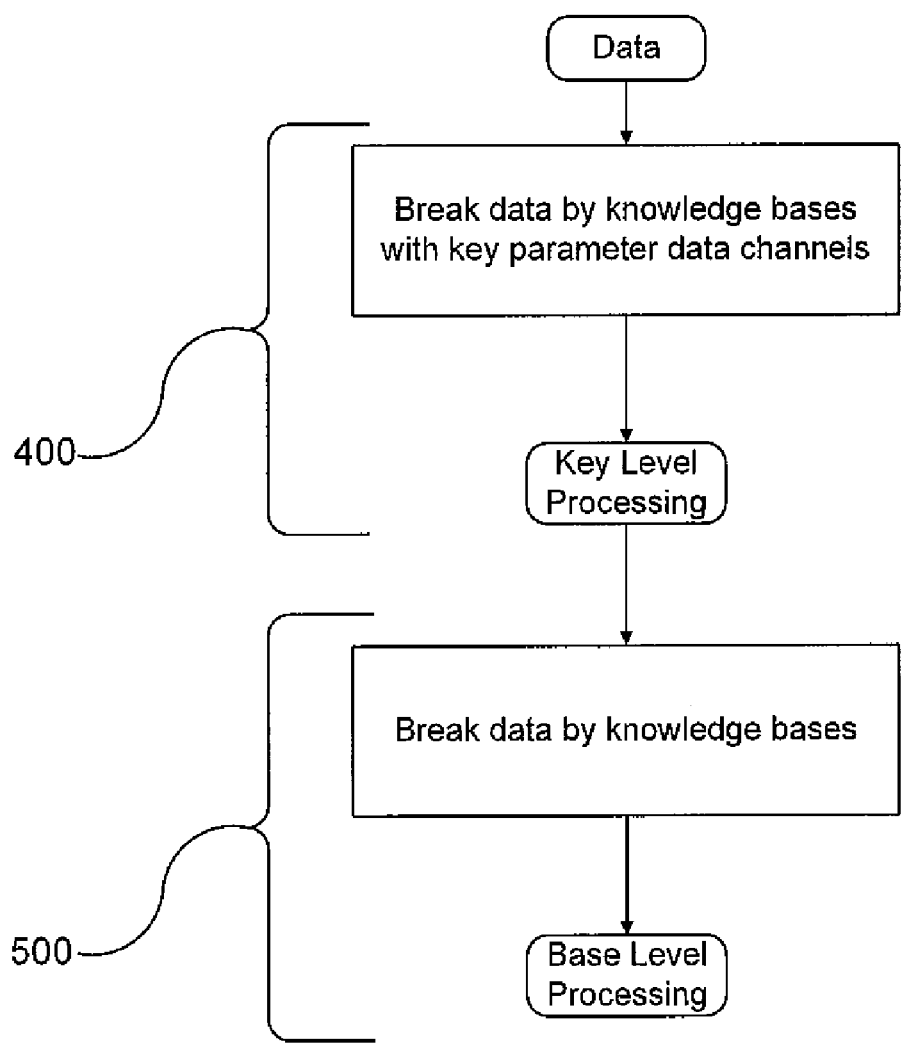
FIG. 2 is a flowchart illustrating the PDM processing levels.

FIG. 2 illustrates in flowchart form the basic algorithm underlying the PDM software 100 for processing data from one or more IPPs at a remote location. Data are collected from sensors on the various pieces of equipment 1 . . . n and processes 1 . . . m in the IPP and are sent to the database 1100, which may be located either in a server that is centrally a located server or includes a distributed network of servers. The method of data collection and storing can also be applied locally at the IPP.

An IPP typically includes multiple pieces of equipment and/or processes, which are monitored by analyzing data collected from the signal outputs of the sensors and transducers that measure operating parameters, such as pressure, temperature, vibration, pH, etc. The processes and equipment will frequently have so-called "key parameters," i.e., parameters that are more critical to proper operation or are more indicative of the health of the process than other parameters. Studying the behavior of the key parameters generally provides more precise information or a clearer picture of the state of the IPP than an analysis of all parameters in a combined way. For this reason, it is useful to identify the key parameters and to first analyze the data from these key parameters, before taking into account all combined parameters. As shown in FIG. 2, the PDM processing logic provides this two-tier analysis by dividing the processing broadly into two levels; key level processing 400 and base level processing 500.

Data incoming from the IPP may be sub-divided into knowledge bases, whereby a knowledge base is a collection of individual parameters, frequently referred to herein as "data channels", that are closely related or indicative of a particular process or equipment. Defining the data in a knowledge base for a particular process or process step provides a basis for monitoring the particular process or step against a pre-defined operating condition, such as a normal operating condition or a known fault condition. Working with knowledge bases also enables "knowledge discovery" of new and/or unforeseen operating states.

Figure 3:
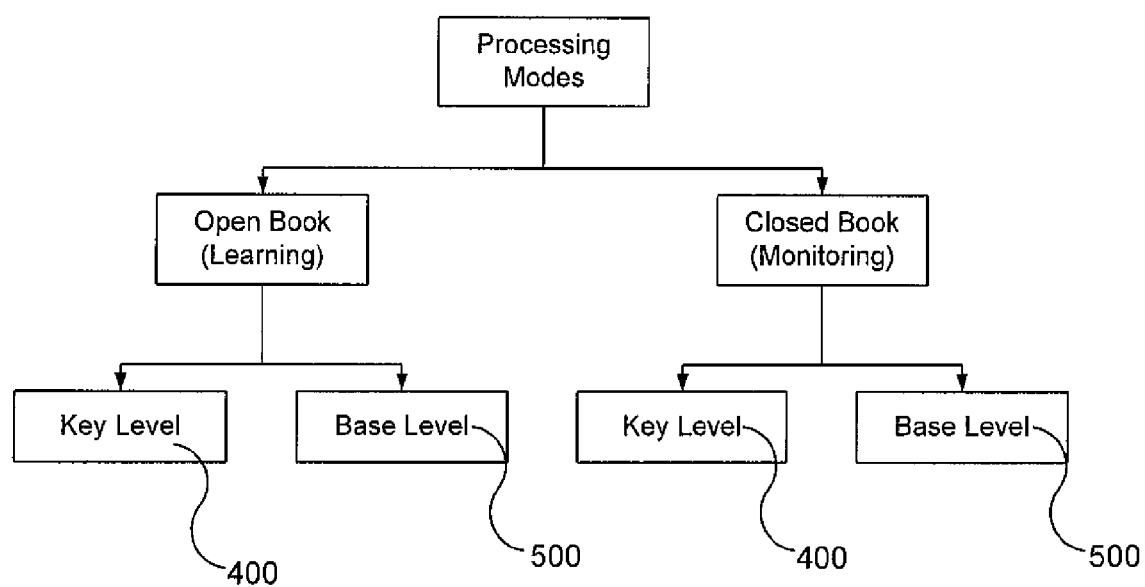
FIG. 3 is a flowchart illustrating processing modes.

FIG. 3 depicts the processing tree of the PDM algorithm. The PDM software 100 has two processing modes, an "open book" or learning mode and a "closed book" or monitoring mode. A knowledge base may be processed in either of the two modes or both of the modes at the same time. Incoming data from the processing plant IPP may be processed either in the learning mode, i.e., the open book mode, or the supervised monitoring mode, i.e., the closed book mode. The open book mode is an unsupervised mode and is used to learn different models of the process and/or equipment being monitored, under different operating conditions. The open book mode is also used when baseline data for the monitoring mode is not available. The closed book mode is used to monitor incoming data against pre-defined "states", which may have been defined based on a-priori information or have been learned during a previously unsupervised mode using either historical or real-time data. In practical application, it is advantageous to allow two identical knowledge bases run simultaneously, one in open-book mode and one in closed-book mode. The closed-book mode will generate alerts and reports, while the open-book mode will generate new clusters, based on incoming data that is outside previously defined states.

Both processing modes may be further branched into the key level processing and the base level processing. The choice of key level or base level processing depends upon the way in which the knowledge base structure has been designed. If a knowledge base has been defined with some data channels as key level data channels, then the algorithm first processes the knowledge base in key level processing, and then in base level processing. If a knowledge base is defined without any data channels as key parameters, then the algorithm automatically proceeds to base level processing, skipping the key level processing step.

A-priori information about the process or equipment to be monitored may be completely lacking or only partially available, such as when a new piece of equipment is brought online or a new process is implemented. In such a case, the PDM software 100 operates in open book or learning mode. All information is then initially "learned", that is, it is collected and stored in new clusters, and is later classified as to the appropriate state or condition, once the system operator interprets the newly acquired knowledge.

Figure 4:
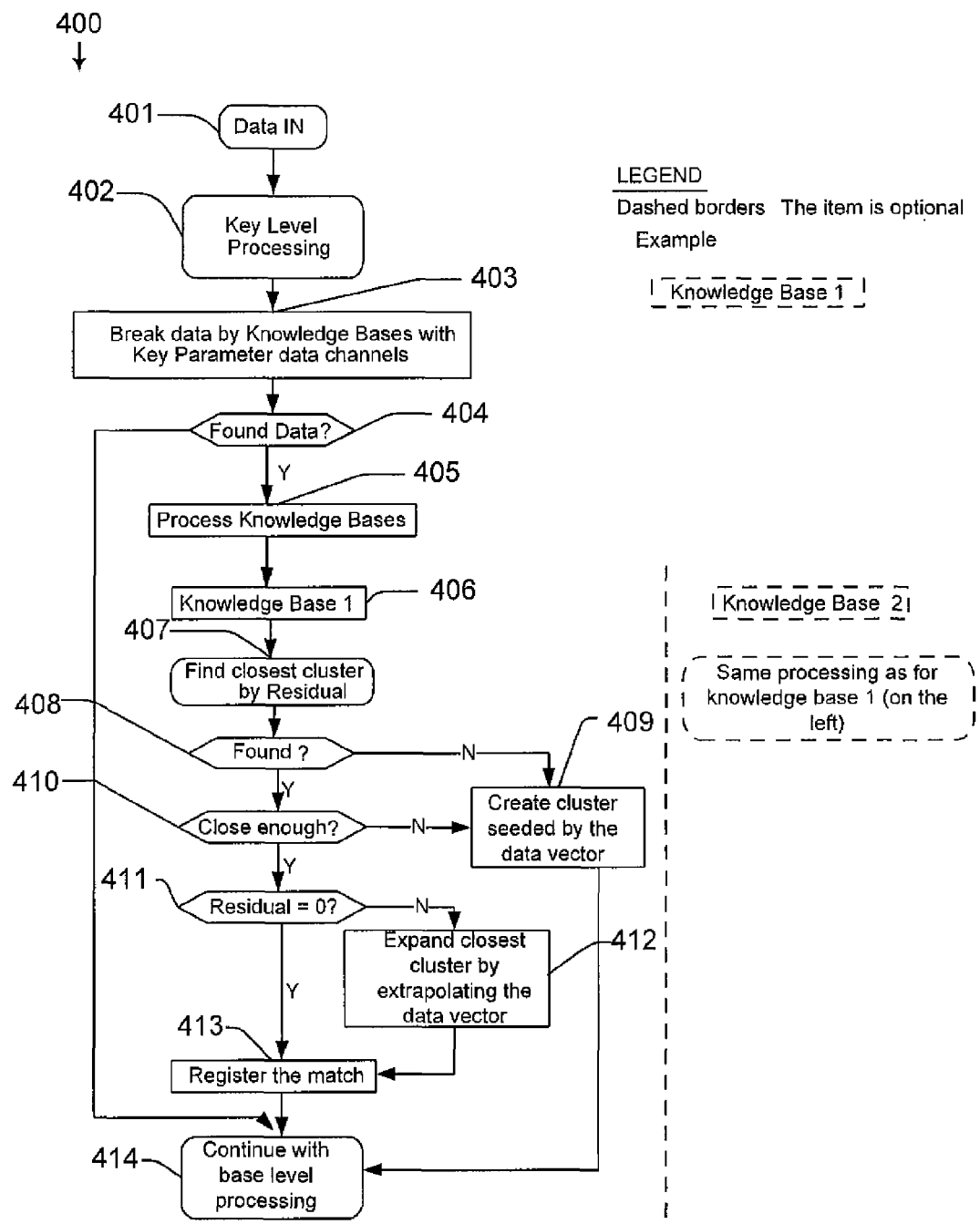
FIG. 4 is a flowchart illustrating open book key parameter processing mode.

FIG. 4 is a flowchart that illustrates open book processing, i.e., processing in unsupervised learning mode, at key level, i.e., with key parameters. Key level processing is designated generally as 400. In this example, the knowledge base is empty prior to initiation of the PDM algorithm.

Step 401: the PDM algorithm receives the latest set of data or values carried in the data channels DC via the data historian DH and reads the values into the database 1100. The tag for each data set is the name of the data channel DC.

Step 402: the PDM algorithm recognizes that the selected data channels are key level data channels and sends the current values for key level processing.

Step 403: the knowledge base is selected such that only the key level data channels are considered and all other data channels are ignored.

Step 404: the PDM algorithm verifies that the data channel contains data. If this check fails, then the program control proceeds to base level processing. If the check returns positive, and data is seen in the data channel, then the program control proceeds to the next step, where the knowledge bases are processed.

Step 405: all knowledge bases that contain parameters or data channels that have been defined as key parameters are processed in parallel. All knowledge bases, whether at key level or base level, are processed the same from step 405 onward.

Step 406: the program control explicitly selects the current knowledge base and processes all clusters within the knowledge base.

Step 407: the closest cluster for the incoming data is determined by calculating the residuals for each cluster and comparing the residuals to one another.

Step 408: the values of the incoming data vector are compared with the values in the clusters. If a closest cluster is not found, then a new cluster is created at step 409.

Step 409: a new cluster is created as needed. The values in the incoming data vector are used as seed values to calculate the cluster boundaries. The program control then goes on to process the base level knowledge bases.

Step 410: if a closest cluster is found after comparing the residuals, then the PDM algorithm determines whether the closeness is enough to warrant an expansion of the cluster. If a negative is returned at this check, then the program control goes back to step 409, where the PDM algorithm creates a new cluster and then proceeds to the next step. If the program logic determines that the incoming data is close enough to an existing cluster, then another check is made at step 411.

Step 411: a check is made to see if the values in the incoming data vector fall inside any cluster, in which case the residual is zero. The fact that the residual is zero implies that the data "fits" the model, or the estimated value of the data and the measured value in the data channel match closely. If a negative match is made at this step, then the program control goes to step 412.

Step 412: the PDM algorithm expands the matched cluster, depending on the user-defined pre-set values.

Step 413: If the result of the check at Step 411 is positive, then the PDM algorithm registers a match at step 413, saves the results to the database 1100 and then continues on to base level processing.

Figure 5:
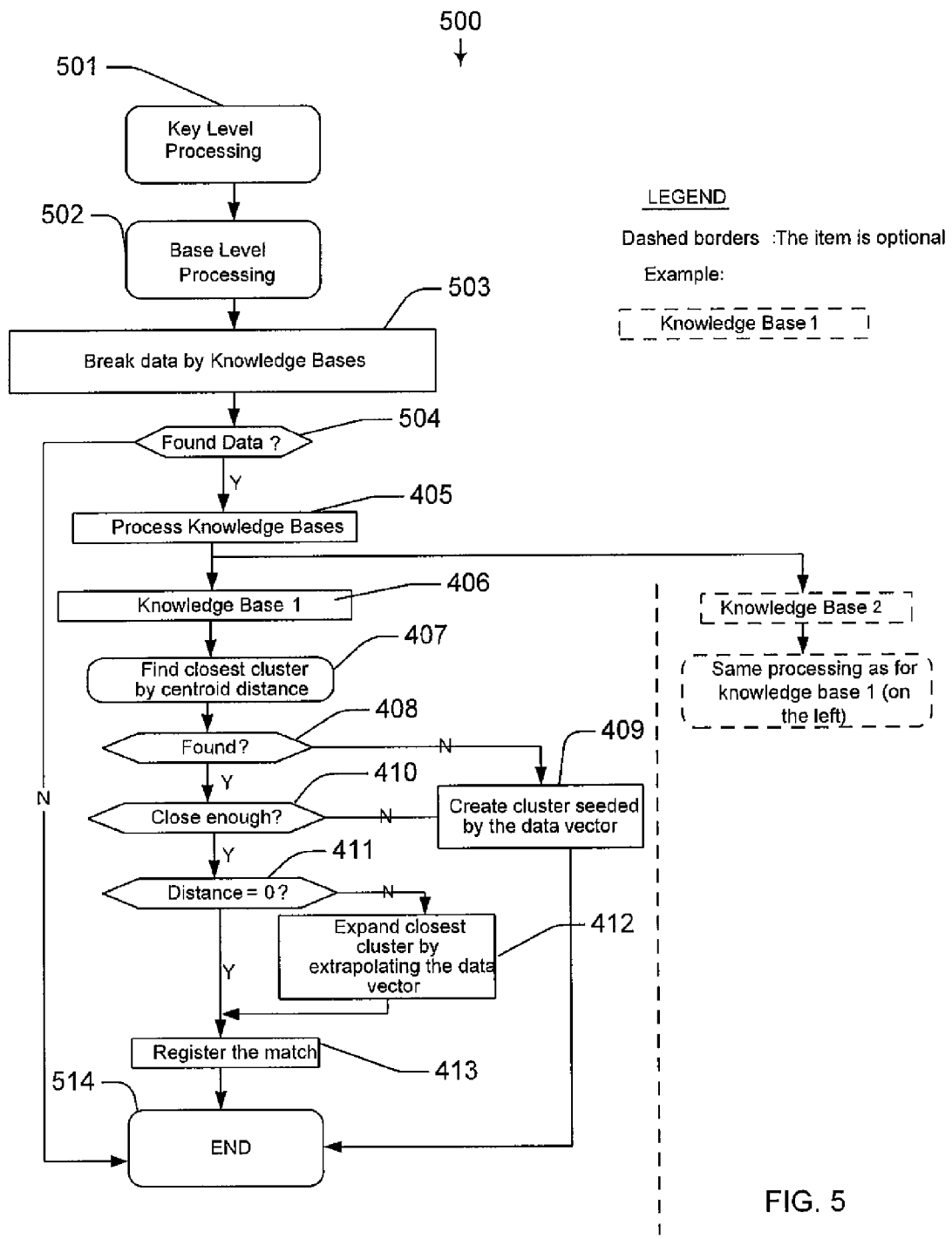
FIG. 5 is a flowchart illustrating open book base level processing mode.

FIG. 5 is a flowchart that illustrates base level processing in open book mode, i.e., the unsupervised learning mode. Base level processing is designated generally as 500. The knowledge base is assumed to be empty prior to initiation of the PDM algorithm.

Step 501: this step begins after key level processing. All knowledge bases with data channels defined as key parameters have been. processed, or there are no knowledge bases with key level parameters. The data channels are received at step 501 and are stored in the database 1100 before processing begins.

Step 502: base level processing explicitly begins at step 502. The PDM algorithm recognizes that the selected data channels are base level data channels, i.e., the parameters for the pump, and sends the current values for base level processing.

Step 503: Each knowledge base is processed individually and all data channels defined within a particular knowledge base are processed.

Step 504: the PDM algorithm verifies that the data channels contain data. If this check fails, then the program control proceeds to the end of the PDM algorithm and the next cycle of data is received after an appropriate wait time. If the check returns positive, the program control proceeds to the next step of processing the knowledge bases.

Step 405: all knowledge bases are processed in parallel. The processing is the same for all knowledge bases from step 405 onward.

After processing all the data through step 413, the PDM algorithm then proceeds to process the next cycle of incoming data.

Figure 6:
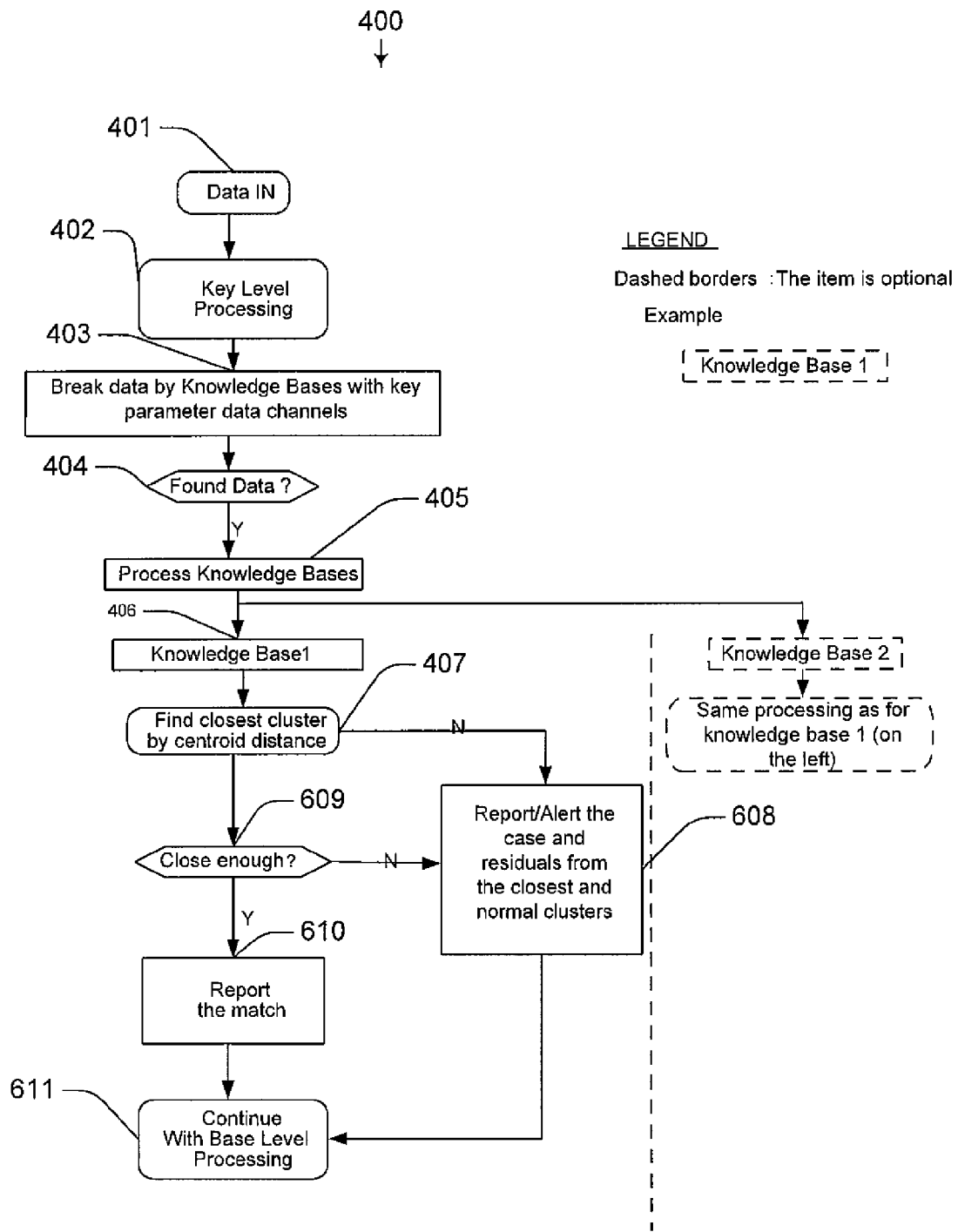
FIG. 6 is a flowchart illustrating closed book key level processing mode.

FIG. 6 is a flowchart illustrating closed book key parameter processing. As mentioned above, the closed-book modes of the PDM software 100 refer to the supervised monitoring mode of operation. This closed-book mode operates on user-defined a-priori information about the process to be monitored. New data is monitored against pre-defined a-priori "knowledge" or "models" or "clusters". The differences between the observed data and the models are reported as the residuals of the process. The magnitude of the residual gives a measure of the severity of the fault condition.

Step 401: as previously described with the open book mode, the PDM algorithm receives the latest set of data channels from the data historian and reads the values into the database 1100. The PDM algorithm recognizes that the selected data channels are key level data channels and sends the incoming values for key level processing in step 402. The next steps 403-407 in the processing of the key level data are as described above in FIG. 4.

Step 608: the PDM algorithm determines whether the incoming data matches close enough to a pre-defined cluster to warrant a match condition.

Step 609: If a negative is returned at the Step 608 check, a report is generated indicating the magnitude of the residual, i.e., the magnitude of difference of the incoming data from the a-priori model). The program control then proceeds to process the base level knowledge bases at step 611.

Step 610: if the Step 608 check returns a positive, then the incoming data is considered to fit the model and is considered a match. A "matched" report is generated and the next data set is considered for processing. The fact that the residual is zero implies that the data set "fits" the model, or the estimated values of the data and the measured values in the data channels match very closely.

Figure 7:
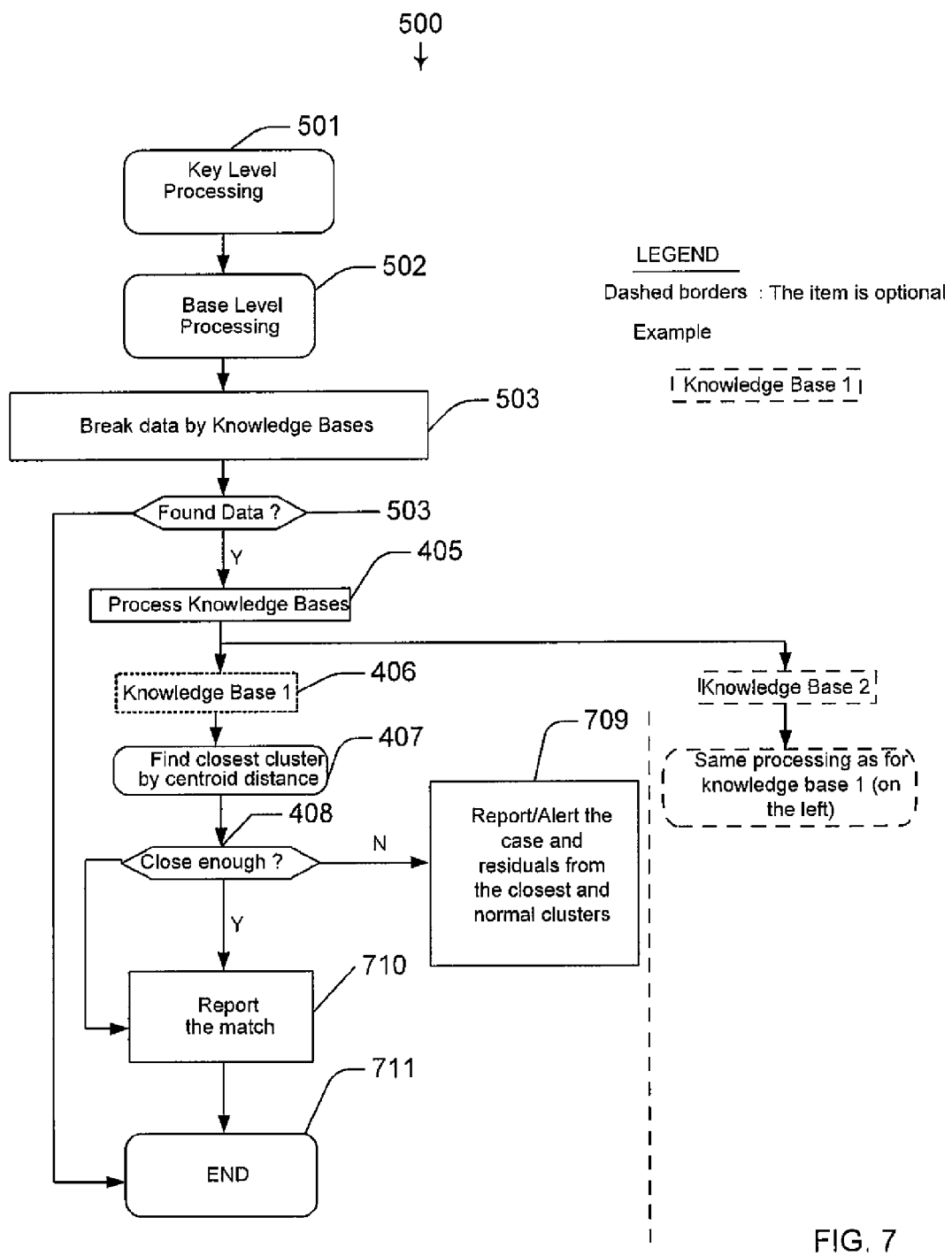
FIG. 7 is a flowchart illustrating closed book base level processing mode.

FIG. 7 is a flowchart that illustrates closed book base level processing. Again, with closed book, or supervised mode, some predefined a-priori models or clusters are defined in the knowledge bases prior to initiation of the PDM algorithm.

Step 701 continues from step 611. The initial steps 501-504 and 405-408 are as previously defined in FIGS. 5 and 6.

Step 408: the algorithm determines whether the closeness is enough to warrant a match condition.

Step 709: If a negative is returned at this check, then the program control proceeds on to step 709, where a report is generated indicating the magnitude of the residual, i.e., the difference of the current data from the a-priori model. The program control then proceeds to process the base level knowledge bases. If the check returns positive, then the data are considered to fit the model and considered a match.

Step 710: A "matched" report is generated and then the next data point is considered for processing. The fact that the residual is zero implies that the data "fit" the model, or the estimated value of the data and the measured value in the data channel match exactly.

Referring again to FIG. 2, incoming data from the plant IPP is first broken down at the first processing level according to user-defined key parameter data channels, and then at the second processing level according to base level data channels.

Figure 8:
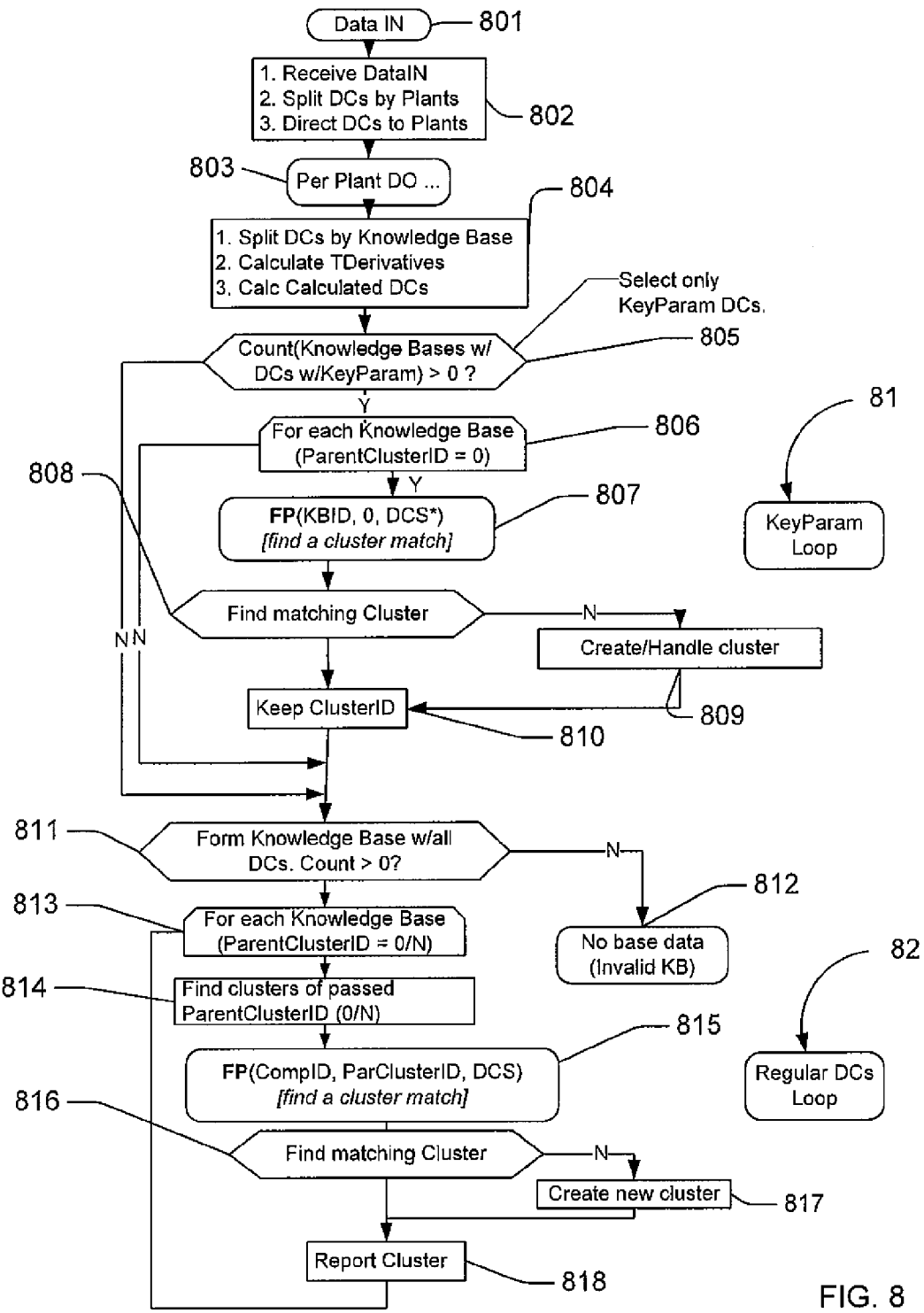
FIG. 8 is a flowchart illustrating PDM logic in detail.

FIG. 8 is a flowchart that shows the process in more detail. The main processing levels are labeled as a key parameter loop 81 and a regular data channels loop 82, which correspond to key level processing and base level processing described above, respectively.

Step 801: data is received into a server S where PDM processing occurs. The databases 1100 are located on the server S. The data are in XML or some other suitable file format. The server S may receive data from various IPPs in a single file or in multiple files.

Step 802: the data channels are segregated by plant names. Each plant IPP has its own database 1100 and the incoming data is directed to the correct plant database 1100.

Step 803: the PDM algorithm is implemented per plant IPP.

Step 804: the data channels are grouped according to knowledge bases. Knowledge bases may be created for different equipment or processes or combinations of equipment and processes in the plant IPP. These knowledge bases are predefined by the user, based on a-priori information, heuristics, functional relationship or some other method. The PDM algorithm calculates the time derivatives based on a time base or on some defined number of data points for each data channel and also analyzes any calculated data channels, if any are defined.

Step 805: the PDM algorithm looks for any knowledge bases that contain key parameters. If there are none, then the program control proceeds to the base processing level at Step 811. If the program logic finds one or more knowledge bases containing key parameters, then the program proceeds to Step 806.

Step 806: the program logic selects each knowledge base one at a time for fingerprinting, also called clustering. The value for the field called "knowledge base ID" is set to 0, i.e., the program logic recognizes that there is no parent knowledge base for this knowledge base, in other words, that this is the top level knowledge base.

Step 807: the program logic assigns an ID to the knowledge base, and sends the data channel values to the fingerprinting (clustering) logic. The result of the fingerprinting is binary, either a match or a no match. If the PDM algorithm considers the data a match, then the data are stored along with the cluster ID. If the PDM algorithm determines a mismatch, and if the knowledge base is in learning mode, a new cluster is created to accommodate the data channel values. If the data are a mismatch and the knowledge base is in monitoring mode, the PDM algorithm records this condition and raises an alert. The matching condition is handled at step 810 and the no match condition is handled at step 809.

Step 808: the PDM algorithm searches for the matching cluster within the knowledge base. It checks for the boundaries of all knowledge bases. The exact method is described below.

Step 809: If a matching cluster is not found within the knowledge base in step 808, the program logic may either create a new cluster that accommodates the data set, expands an existing cluster to accommodate the data set, or if in closed book mode, registers the residual, which is defined as the difference between the cluster or model and the incoming data point.

Step 810: On the other hand, if a match is determined, then the program logic registers the cluster ID and increases a match counter. The program control follows this iterative loop until it processes all knowledge bases with key parameters. It then processes all other knowledge bases, from step 811 onwards.

Step 811: the program control checks to see if all the knowledge bases contain defined data channels.

Step 812: If no data channels are defined, then the knowledge base is declared invalid and a report is generated.

Step 813: the program control starts processing each knowledge base sequentially. It considers the parent cluster within each knowledge base and finds the related clusters at the lower level.

Step 815, the knowledge base ID, parent cluster ID, and the data channel value are sent to a fingerprinting (FP) algorithm to find a matching cluster.

Step 816: The result of the fingerprinting algorithm is processed to determine a match to an existing cluster or a no-match.

Step 817: If no match is found, a new cluster is created according to pre-defined parameters. If a match is determined, then it is reported accordingly.

Figure 9:
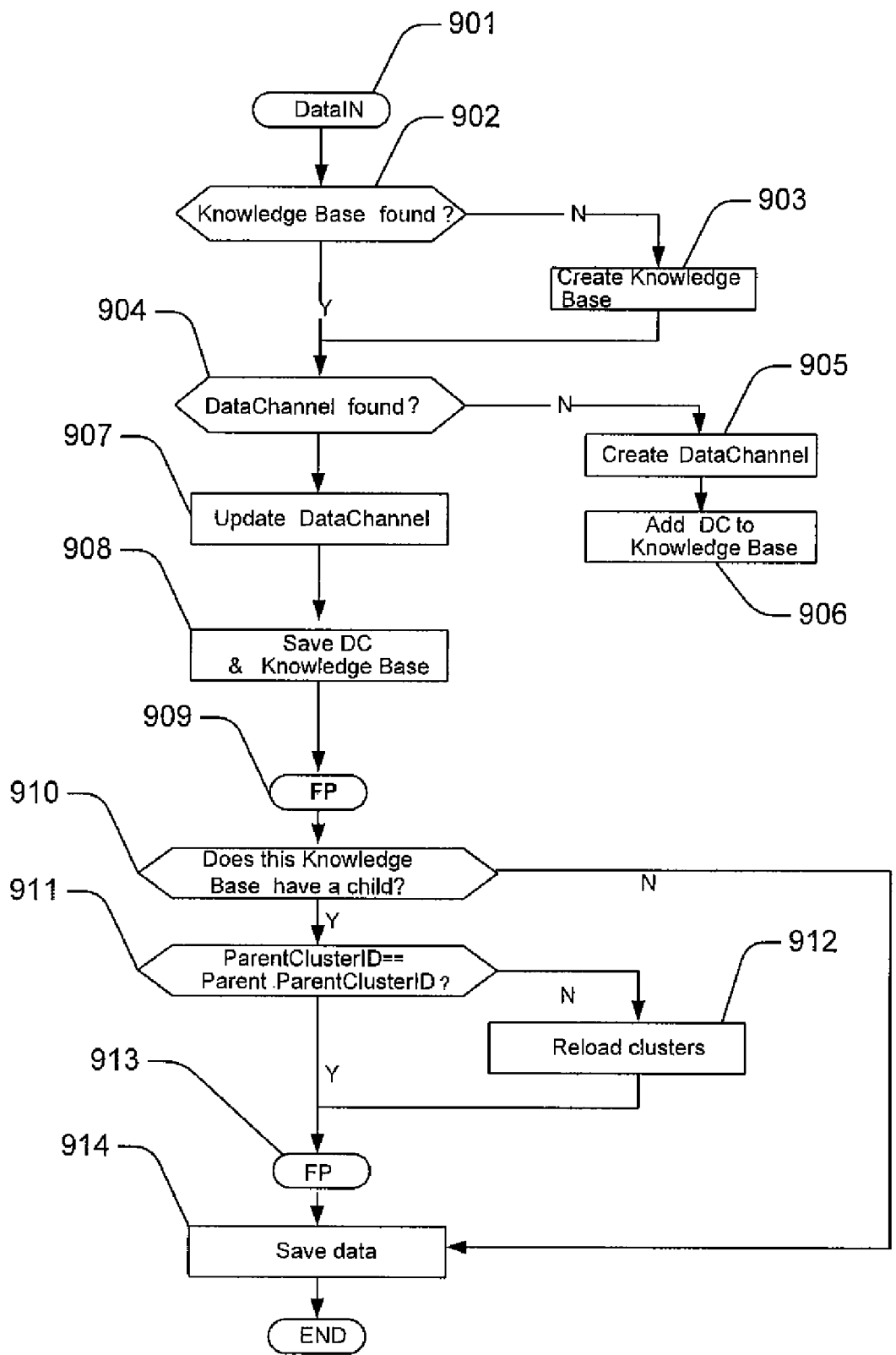
FIG. 9 is a flowchart illustrating PDM pre finger-printing logic.

FIG. 9 is a flowchart illustrating the PDM pre-fingerprinting (pre-FP) logic. This section describes a top-down view of how the PDM software 100 handles multiple levels of knowledge bases. If a knowledge base is defined with key parameter(s), the processing is a two step process. The PDM algorithm first creates a parent knowledge base with only the data channels marked as key parameters, which we call the parent knowledge base. The PDM algorithm then creates a new knowledge base with all other data channels including those marked as key parameters, which is referred to as a child knowledge base. When the PDM algorithm begins processing, it first processes the parent knowledge base, and then the set of child knowledge bases associated with it. The actual FP-logic or clustering is described in a later section.

Step 901: data are received for PDM pre-fingerprinting.

Step 902: pre-FP-logic begins by checking whether pre-existing knowledge bases exist.

Step 903: if none exist, the program control then proceeds to a module to create a new knowledge base.

Step 904: if a pre-existing knowledge base is found, then the program control looks into the knowledge base for the defined data channels.

Step 905: if data channels are not found in the incoming data array, then a data channel is created.

Step 906: the newly created data channel is added to the knowledge base.

Step 907: if a data channel is found, then the data channel values are updated.

Step 908: the data channel and knowledge base are saved in appropriate tables in the database 1100.

Figure 10:
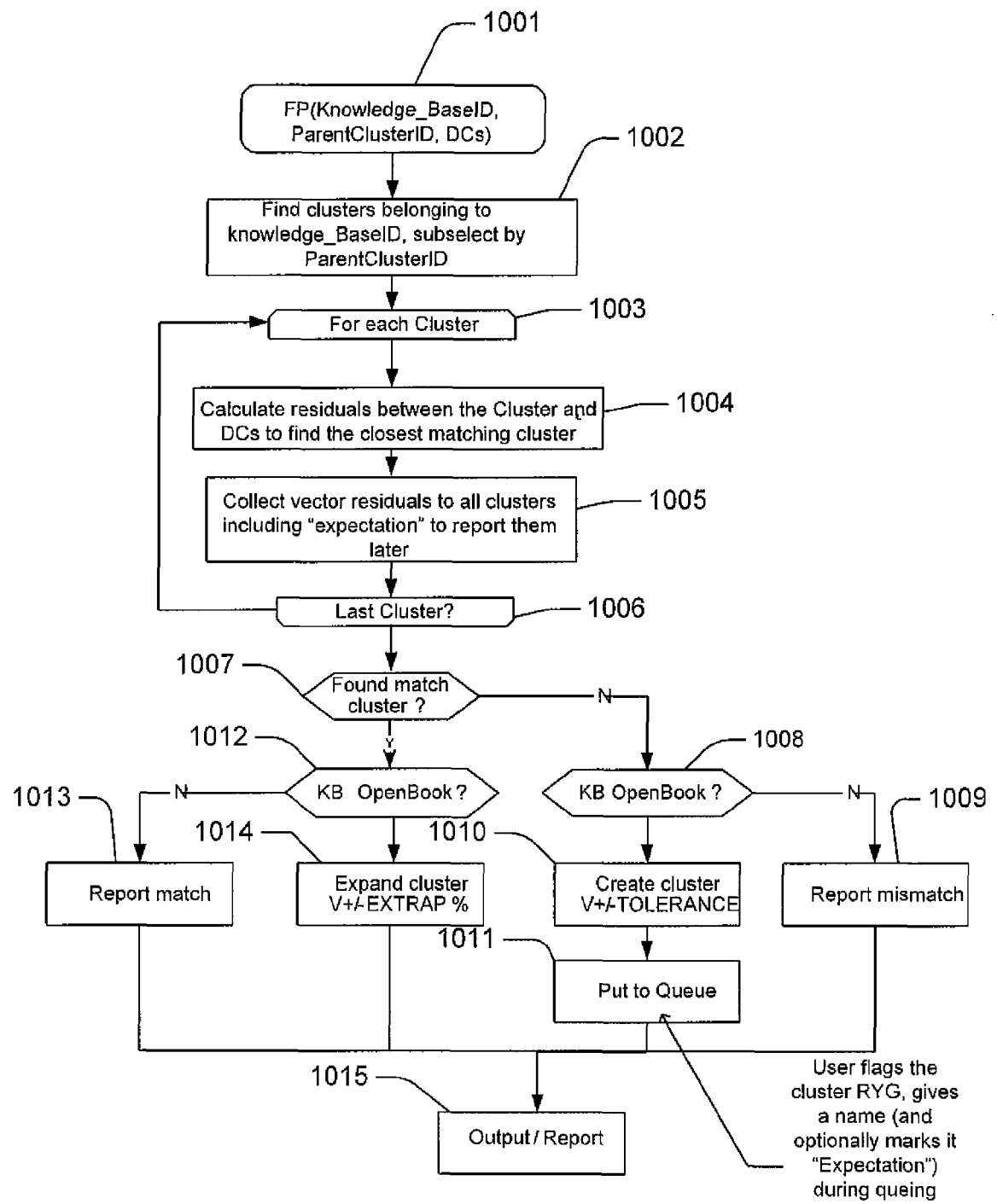
FIG. 10 is a block diagram illustrating the fingerprinting process using a clustering algorithm.

Step 909: the program control logic proceeds to the actual fingerprinting (FP) module in FIG. 10.

Step 910: the program control logic looks to see if the knowledge base contains a child knowledge base, that is, another knowledge base at a lower level of processing. If no child knowledge bases are defined, then the program logic skips to step 914 to save the processing results. If child knowledge bases are defined, then the program logic proceeds to step 911.

Step 911: the program control determines whether the parent cluster ID is the same as the current cluster ID.

Step 912: if the parent cluster ID is not the same as the current cluster ID, then the clusters at that level are reloaded.

Step 913: If the parent cluster ID matches the current cluster ID, the data channels are sent over to the actual FP module.

Step 914: all data, data channel values, results from the FP module are saved. The program routine then ends.

FIG. 10 is a flowchart illustrating an FP algorithm for a preferred embodiment of the PDM software 100. The FP algorithm is based on a mathematical method called clustering. We describe the FP algorithm step by step as follows.

Step 1001: the FP algorithm receives the knowledge base ID, the parent cluster ID, and the data channels that are defined within the knowledge base. The knowledge base ID identifies the particular cluster that the algorithm is processing at that particular iterative loop.

Step 1002: the FP algorithm selects the particular knowledge base definitions within the database and selects the clusters within that knowledge base. For example, if the knowledge base is the "pump," the clusters are for "normal pump condition at full plant load," "normal pump condition at 50% plant load," "pump fault condition at full load," etc.

Step 1003: the FP algorithm then processes the selected clusters one by one, in an iterative process.

Step 1004, the FP algorithm calculates the residual between each cluster within the knowledge base, selected at step 1002, and the incoming data. In essence, the FP algorithm is calculating the difference between the incoming measurements and the predicted model output for each model or cluster. This is done to calculate the so-called "closest match", which is the minimum residual. The minimum residual to a cluster indicates the most likely model that "fits" the current data.

Step 1005: all the calculated residuals are stored in a vector. The vector is used for reporting the residuals. If an expectation cluster is defined, then the residual to that cluster is also stored at this point.

Step 1006: the FP algorithm checks the increment counter to decide whether to iterate for the next cluster to calculate the residuals.

Step 1007: if all the clusters within the knowledge base have been processed, then the FP algorithm checks to see whether the value for a residual is zero, which indicates a perfect match to the cluster and hence to the model.

Step 1008: if the check returns a negative, that is, if an exact match to an existing cluster is not found, then the program control logic determines whether the FP algorithm is running in open book mode.

Step 1015: if the result is a negative, i.e., the FP algorithm is running in closed-book mode, then the FP algorithm simply reports a mismatch and saves the report. The FP algorithm then goes to the next iteration.

Step 1010: if the result at step 1108 is a positive, i.e., the FP algorithm is running in open book mode, a new cluster is created. The current data are taken as the seed points and the cluster boundaries are computed using predefined tolerance values.

Step 1011: the new cluster is reported in a queue table in the database.

Step 1015: a final report is generated.

Step 1012: if the check in step 1107 returns a positive, that is, the current data matched an existing cluster within the knowledge base, another check is made to determine whether the FP algorithm is running in open book mode.

Step 1013: if the result of the check in Step 1012 is negative, then the FP algorithm proceeds to step 1013, where a match is registered and then to step 1015, where the match is stored on the database. The FP algorithm then proceeds on to the next iterative step.

Step 1014: if the check in step 1012 returns a positive result, i.e., the FP algorithm is running in open-book mode, then the current cluster is expanded to include the current data set. The expansion is based on a predefined extrapolation percent.

Step 1015: the results are stored in the database.

Figure 11:
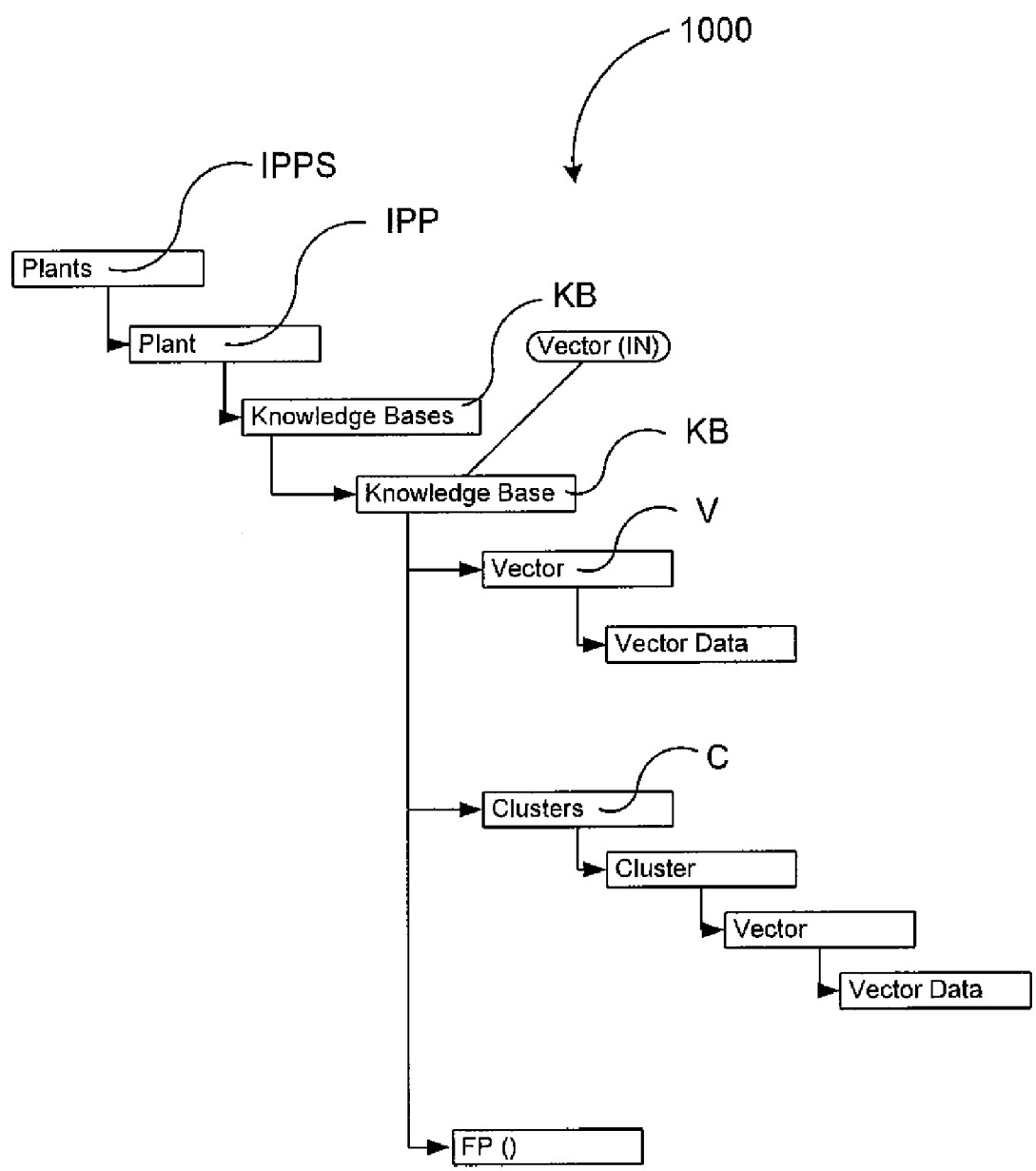
FIG. 11 is a flowchart illustrating PDM object hierarchy

FIG. 11 is a block diagram illustrating the object hierarchy tree of the PDM system 1000 and the relationships of parent/child objects. The topmost member object of the hierarchy tree is a plants object IPPS, which is an object that has at least one IPP under it. A client may have a fleet of IPPs that need monitoring and an object IPPS may have several other plant objects IPP under it. By way of illustration, a plants object IPPS is a steam power generation company having several power generating plants IPP that include a first power station, a second power station, etc.

Each plant IPP may have several knowledge bases KB defined within it. In this example, each power generating plant has a knowledge base for the boiler, a knowledge base for at least one pump, etc. A plant IPP must have at least one knowledge base KB defined within it for monitoring to occur. Each knowledge base encompasses a plurality of correlated parameters, i.e., data channels, and at least one model or cluster. As time goes on and various operating conditions become known, the knowledge base expands to encompass a plurality of models or clusters. Each data channel carries data from a specific sensor; each cluster encompasses all the data channels of the knowledge base, but the values of the data in the cluster correspond to specific operating conditions. Thus, a first cluster in the knowledge base "pump" may contain values of the parameters that correspond to normal operation at 100% power load; a second cluster contain values of the same parameters that correspond to normal operation at 50% power load; a third cluster contain values of the same parameters that correspond to a known fault condition at 100% power load; etc. Examples of data channels DC for the knowledge base "pump" include: pressure, bearing oil temperature, flow rate, vibration on pump shaft, etc. A cluster may have a "child" cluster. Vector objects V are at the next level in the object hierarchy. Vector objects V are arrays of numbers that represent either the system data or model information, such as, for example, the cluster boundaries. A minimum-maximum tolerance is assigned to each value within a cluster that corresponds to a particular condition. Thus, minimum-maximum tolerances are assigned to the values of parameters in the first cluster mentioned just above and different minimum-maximum tolerances may be assigned to the values of the same parameters in the second cluster. The incoming data are pulled from the database as a vector V of data channels DC, with each data channel forming a member element, that is, a single output signal of a particular sensor, of an incoming vector array.

The knowledge base KB also has a fingerprinting FP object. The FP object implements an algorithm that partitions the data into different operating conditions, like fault conditions, normal operating conditions, or other, and also stores the data at the appropriate location in the database 1100.

It is understood that the embodiments described herein are merely illustrative of the present invention. Variations in the construction of the method for process data mining may be contemplated by one skilled in the art without limiting the intended scope of the invention herein disclosed and as defined by the following claims.

What is claimed is:

1. A method of analyzing data relating to parameters of a component in a process plant, a component being a piece of equipment, a location, or a process step, and a process plant being an agglomeration of equipment and/or process steps, the method comprising the steps of:
   a) defining a set of data channels as a data vector for a particular component, each data channel in the set carrying data relating to a specific parameter of the particular component, such that a first data channel of the set carries data relating to a first specific parameter and a second data channel transmits data relating to a second specific parameter, the data vector being a discrete transmission of instantly measured data vector of the set of data channels, each discrete transmission being indicative of an operating condition of the particular component;
   b) defining a knowledge base that relates to the particular component;
   c) receiving the discrete transmission of the instantly measured data vector into the knowledge base;
   d) prior to defining a cluster that encompasses a first data vector for a first operating condition of the particular component in the knowledge base, operating the knowledge base in open-book mode;
   e) providing a cluster-generating algorithm that generates an initial cluster from the instantly measured data vector; and
   f) adding the initial cluster to the knowledge base, the initial cluster subsequently serving as a pre-defined cluster.

2. The method of claim 1, further comprising the steps of:
   g) providing one or more pre-defined clusters in the knowledge base, the pre-defined cluster being a pre-defined data vector having pre-defined boundaries for expected values of the data vector from the plurality of data channels in the knowledge base, each one cluster of the one or more pre-defined clusters being indicative of a specific one operating condition, such that, when more than one pre-defined cluster is provided, a first cluster is indicative of a first operating condition and a second cluster is indicative of a second operating condition;
   h) providing a cluster-matching algorithm that determines whether one pre-defined cluster of the one or more pre-defined clusters encompass transmitted values of the instantly measured data vector;
   i) upon determining that the one pre-defined cluster encompasses the transmitted values of the instantly measured data vector, adding the instantly measured data vector to the one pre-defined cluster; and
   j) upon determining that none of the one or more pre-defined clusters encompass the transmitted values of the instantly measured data vector, creating a new cluster having boundaries that encompass the instantly measured data vector.

3. The method of claim 2, further comprising the step of:
   k) operating the knowledge base in closed-book mode, for monitoring operation of the particular component;
   l) upon determination of the cluster-matching algorithm that the transmitted values of the instantly measured data vector fall within the pre-defined boundaries of the pre-defined cluster, allocating the instantly measured data vector to the pre-defined cluster; and,
   m) upon determination of the cluster-matching algorithm that the transmitted values of the instantly measured data vector fall outside the pre-defined boundaries of the pre-defined cluster, issuing a report on the instantly measured data vector.

4. The method of claim 1, further comprising the following steps:
   n) identifying each pre-defined cluster of the one or more pre-defined clusters within the knowledge base as representative of a particular operating state, wherein a first pre-defined cluster corresponds to a first operating state and a second pre-defined cluster corresponds to a second operating state;
   o) comparing the instantly measured data vector with the pre-defined clusters, so as to determine a closest cluster, the closest cluster having cluster boundaries that encompass the transmitted values of the instantly measured data vector;
   p) determining a residual value of the instantly measured data vector relative to an expected value of the closest cluster, the expected value being defined by the cluster boundaries and the residual value defining a distance between the instantly measured data vector and the expected value of the closest cluster;
   q) determining a match condition if the residual value is within the cluster boundaries; and
   r) determining a no-match condition, if the residual value is outside the cluster boundaries.

5. The method of claim 4, further comprising the steps of:
   s) providing a pre-defined boundary-expansion tolerance for each of the one or more pre-defined clusters;
   t) determining that the residual value of the instantly measured data vector lies within the pre-defined boundary-expansion tolerance of one of the pre-defined clusters; and
   u) expanding the knowledge base by automatically expanding the cluster boundaries of said one of the pre-defined clusters, so as to obtain an expanded cluster that encompasses the transmitted values of the instantly measured data vector.

6. The method of claim 5, further comprising the steps of:
   v) within the knowledge base, defining all the data channels of the knowledge base as base level parameters;
   w) within each of the one or more pre-defined clusters, defining one or more of the base level parameters as being particularly indicative of a particular operating state and defining the at least one or more base level parameters to also be a corresponding one or more key level parameters;
   x) within the knowledge base, defining a key-level knowledge base that contains a key-level cluster comprising a selection of the one or more key level parameters, the key-level cluster being indicative of a particular operating state of the component;
   y) first processing with the algorithm the key level parameters in the key-level knowledge base to determine a match with the key-level cluster, so as to determine the particular operating state, and then subsequently processing the base level parameters against the pre-defined clusters that correspond to the particular operating state.

7. The method of claim 6, the step of processing the base level parameters comprising the steps of:

z) forming a base-level knowledge base comprising all data channels;

aa) within the base-level knowledge base defining one or more parent clusters and one or more child clusters, wherein a first parent cluster corresponds to a first operating condition and a first child cluster of the first parent cluster corresponds to a particular scenario within the first operating condition;

ab) applying a fingerprinting algorithm to the one or more parent clusters;

ac) searching for a match of the data values of the discrete transmission with the expected value of an individual parent cluster of the one or more parent clusters;

ad) if a match is found with the individual parent cluster, associating a cluster ID of the individual cluster with the transmitted values of the instantly measured data vector and incrementing a cluster counter for the individual parent cluster; and ae) if a no-match with the one or more parent clusters is found, expanding the base-level knowledge base by generating a new algorithm-defined parent cluster that reflects the transmitted values of the instantly measured data vector.

8. The method of claim 6, the step of processing the key level parameters further comprising the steps of:

af) ascertaining whether the process plant includes a plurality of plants;

ag) allocating a collection of the data channels to a corresponding one plant of the plurality plants; and ah) sequentially processing a first knowledge base of each plant of the plurality of plants and then a second knowledge base of the each plant.

9. The method of claim 2, further comprising the steps of:

ai) operating the cluster-generating algorithm concurrently in the open-book mode and in a closed book mode, wherein the closed-book mode disallows generation of a new initial cluster;

aj) providing pre-existing data for the knowledge base, so as to provide at least one cluster that is a first pre-defined cluster that has cluster boundaries that are defined by a minimum-maximum tolerance range for each data vector;

ak) comparing the transmitted values of the instantly measured data vector with values in the first pre-defined cluster;

al) determining whether the transmitted values of the instantly measured data vector fall within the cluster boundaries of the first pre-defined cluster;

am) upon determining a match, issuing a match report; and an) upon determining a no-match, issuing a no-match report.

10. The method of claim 1, the step of defining a knowledge base further comprising the step of:

b1) defining a plurality of knowledge bases, each knowledge base of the plurality relating to one particular component and containing data channels for the one particular component.

11. The method of claim 10 further comprising the steps of:

b2) defining a first knowledge base as comprising a first set of data channels and defining a second knowledge base as comprising a second set of data channels, wherein the first and the second sets of data channels are exclusive of each other.

\* \* \* \* \*